Patented July 25, 1939

2,167,514

UNITED STATES PATENT OFFICE 2,167,514

COLORING RUBBER

Maldwyn Jones and Walter Fairbairn Smith, Blackley, Manchester, England, and Alexander Stewart, Grangemouth, Scotland, assignors to Imperial Chemical Industries, Limited, a corporation of Great Britain No Drawing. Application January 14, 1937, Serial No. 120,634. In Great Britain January 17, 1936

8 Claims. (Cl. 18—50)

In the specification of U. S. application Ser. No. 10,128, now Patent No. 2,079,350, issued May 4, 1937, there is described the manufacture of new dry preparations for coloring rubber by incorporating a finely-divided coloring matter in aqueous suspension, with a softening agent comprising a compound with a long alkyl chain, melting below 100° C. and preferably about 50°C., with rubber latex with the addition of a dispersing agent, drying the mixture and milling to give a uniform product. These preparations are highly colored solids, slightly elastic, tough and clean in handling, and they incorporate easily into the rubber on the roller-mill, quickly giving full color value in uniform shades free from specks.

According to this invention, which is an improvement in, or modification of, that of the above-mentioned specification, new and improved blue, blue-green, and green preparations of the sort described and having the same properties are obtained by using as coloring matters in the process described, phthalocyanines with or without the disazo compound which is obtainable by coupling tetrazotised 3:3'-dichloro-benzidine with 2 molecules of acetoacet-o-toluidide. These new preparations color rubber in blue, blue-green and green shades, which are purer, more brilliant and faster than the shades obtained by the coloring matters specifically described in the above specification. They are fast to vulcanisation both in the press and in open steam and are non-bleeding.

The phthalocyanine and the disazo compounds may be incorporated into separate coloring preparations and the coloring preparations then mixed.

The term phthalocyanine is used to signify a group of substances to which a particular nuclear molecular structure may be attributed, see Linstead and others, Journal of the Chemical Society 1934, 1016.

The following examples in which parts are by weight illustrate, but do not limit, the invention:

*Example 1.*—375 parts of a finely-divided 20% aqueous paste of copper phthalocyanine (containing not more than 0.01% of free metallic copper or copper salts, calculated on the dry weight of the copper phthalocyanine present) are put into a steam-jacketed pan and warmed to 60–65° C. 18 parts of a 15% aqueous paste of the sodium salt of the sulfuric ester of cetyl alcohol are added, the resulting mixture is stirred for 10 minutes, 60.5 parts of strained 60% rubber latex are added in a steady stream, and stirring continued at 60–65° C. for 15 minutes. 36 parts of commercial stearic acid are melted and stirred in during 15 minutes, and stirring is continued for a further 15 minutes. The soft homogeneous paste is dried at 100° C. in trays, and this dry product then milled on a rubber roller-mill and finally sheeted. A coloring matter is obtained which colors rubber in brilliant greenish-blue shades.

*Example 2.*—375 parts of a finely-divided 20% aqueous paste of metal-free phthalocyanine (prepared as described in British specification No. 389,842) are put into a steam-jacketed pan and warmed to 60–65° C. 18 parts of a 15% aqueous paste of the sodium salt of the sulfuric ester of cetyl alcohol are added, and the resulting mixture is stirred for 10 minutes. 60.5 parts of strained 60% rubber latex are then added in a steady stream and stirring continued at 60–65° C. for 15 minutes.

36 parts of commercial stearic acid are melted and stirred in during 15 minutes, and stirring continued for another 15 minutes. The soft homogeneous paste is dried at 80°C. in trays, and the dry product then milled on a rubber roller-mill and finely sheeted. It has similar properties to the product of Example 1, and colors rubber in bright blue shades.

*Example 3.*—This is as Example 2, but instead of the 375 parts of a finely-divided 20% aqueous paste of metal-free phthalocyanine, there are used 250 parts of this substance and 125 parts of a finely-divided 20% aqueous paste of the disazo compound, which is obtainable by coupling tetrazotised 3:3'-dichlorobenzidine with 2 molecules of acetoacet-o-toluidide. A coloring matter is obtained which colors rubber in bright, fast green shades.

*Example 4.*—A yellow rubber coloring matter is made by the process described in Example 1, except that instead of the finely-divided 20% aqueous paste of copper phthalocyanine there is used the same quantity of a finely-divided aqueous paste of the disazo dyestuff obtainable by coupling tetrazotised 3:3'-dichlorobenzidine with 2 molecules of acetoacet-o-toluidide.

One part of the resulting yellow coloring matter is then mixed, by milling on the rubber-roller mill, with 2 parts of the blue coloring matter obtained according to Example 1. The same green coloring matter is obtained as in Example 3.

Coloring matters of different shades of green may be obtained by milling the yellow and green coloring matter in proportions different from those of Example 3.

As many apparently widely different embodiments of this invention may be made without departing from the spirit and scope thereof it is to be understood that the invention is not limited to the specific embodiments thereof except as defined in the appended claims.

We claim:

1. A coloring composition comprising a phthalocyanine pigment and a higher fatty acid incorporated in rubber latex, the entire composition being in the form of a waxy solid adapted to color rubber by incorporation on a roller mixer.

2. A coloring composition comprising copper phthalocyanine, stearic acid, a dispersing agent, and rubber latex, the entire composition being in the form of a waxy solid, which disperses readily in rubber by mastication.

3. A coloring composition comprising metal-free phthalocyanine, stearic acid, a dispersing agent, and rubber latex, the entire composition being in the form of a waxy solid, which disperses readily in rubber by mastication.

4. A coloring composition comprising a phthalocyanine pigment, a disazo, benzidine-type, pigment which is adapted to impart to rubber a yellow color, a higher fatty acid, a dispersing agent, and rubber latex, the entire composition being in the form of a waxy solid, which disperses readily in rubber by mastication.

5. A composition of matter comprising by weight substantially 75 parts of copper phthalocyanine, 2.7 parts of cetyl-sodium-sulfate, 36 parts of rubber latex and 36 parts of stearic acid, all together forming a solid, waxy sheet which disperses readily in rubber by mastication.

6. A process for converting a phthalocyanine pigment into a form which works readily into rubber on a roller mill to form a colored rubber, which comprises incorporating a phthalocyanine pigment into rubber latex jointly with a higher fatty acid, and evaporating the composition to dryness.

7. A process for converting a phthalocyanine pigment into a form which works readily into rubber on a roller mill to form a colored rubber, which comprises incorporating a phthalocyanine pigment into rubber latex jointly with a higher fatty acid and a dispersing agent, and evaporating the composition to dryness.

8. A process for converting a phthalocyanine pigment into a form which works readily into rubber on a roller mill to form a colored rubber, which comprises incorporating a phthalocyanine pigment into rubber latex jointly with a higher fatty acid, a dispersing agent, and a disazo pigment of the benzidine type which is adapted by itself to color rubber in yellow shades, and evaporating the composition to dryness.

MALDWYN JONES.
WALTER FAIRBAIRN SMITH.
ALEXANDER STEWART.